United States Patent
Nakayama et al.

[15] 3,652,247
[45] Mar. 28, 1972

[54] METHOD AND APPARATUS FOR SHAPING THE ENDS OF GLASS TUBE

[72] Inventors: Toshio Nakayama; Shoichi Horikawa, both of Otu-shi, Japan

[73] Assignee: Nippon Electric Glass Company Limited, Tokyo, Japan

[22] Filed: Oct. 6, 1969

[21] Appl. No.: 863,846

[30] Foreign Application Priority Data

Dec. 11, 1968 Japan..................................43/90649

[52] U.S. Cl....................................65/104, 65/105, 65/109, 65/113, 65/244, 65/276, 65/279, 65/292
[51] Int. Cl......................................C03b 23/04, C03b 33/08
[58] Field of Search....................65/104, 105, 108, 112, 174, 65/113, 120, 244, 276, 279, 292

[56] References Cited

UNITED STATES PATENTS

| 2,394,115 | 2/1946 | Snyder | 65/279 |
| 2,523,006 | 9/1950 | Gaskill et al. | 65/174 |
| 3,215,517 | 11/1965 | Zimmermann | 65/105 |

Primary Examiner—Reuben Friedman
Assistant Examiner—Saul R. Friedman
Attorney—Hall & Houghton

[57] ABSTRACT

Glass tubes are transferred while being rotated by means of roller groups arranged in a plurality of rows. Intermediate between the ends of the transfer path, on both sides of the roller groups and in intermediate positions corresponding to the portions to be treated of the glass tube close to both ends thereof, there are correspondingly provided burners, a shaping rail for squeeze shaping the tube cooling pipes, a cutter burner and thin circular cutting plate for cutting the tube at the middle of the shaped portion and burners for smoothing the cut surfaces and for successively cooling those surfaces with gentle flames.

7 Claims, 10 Drawing Figures

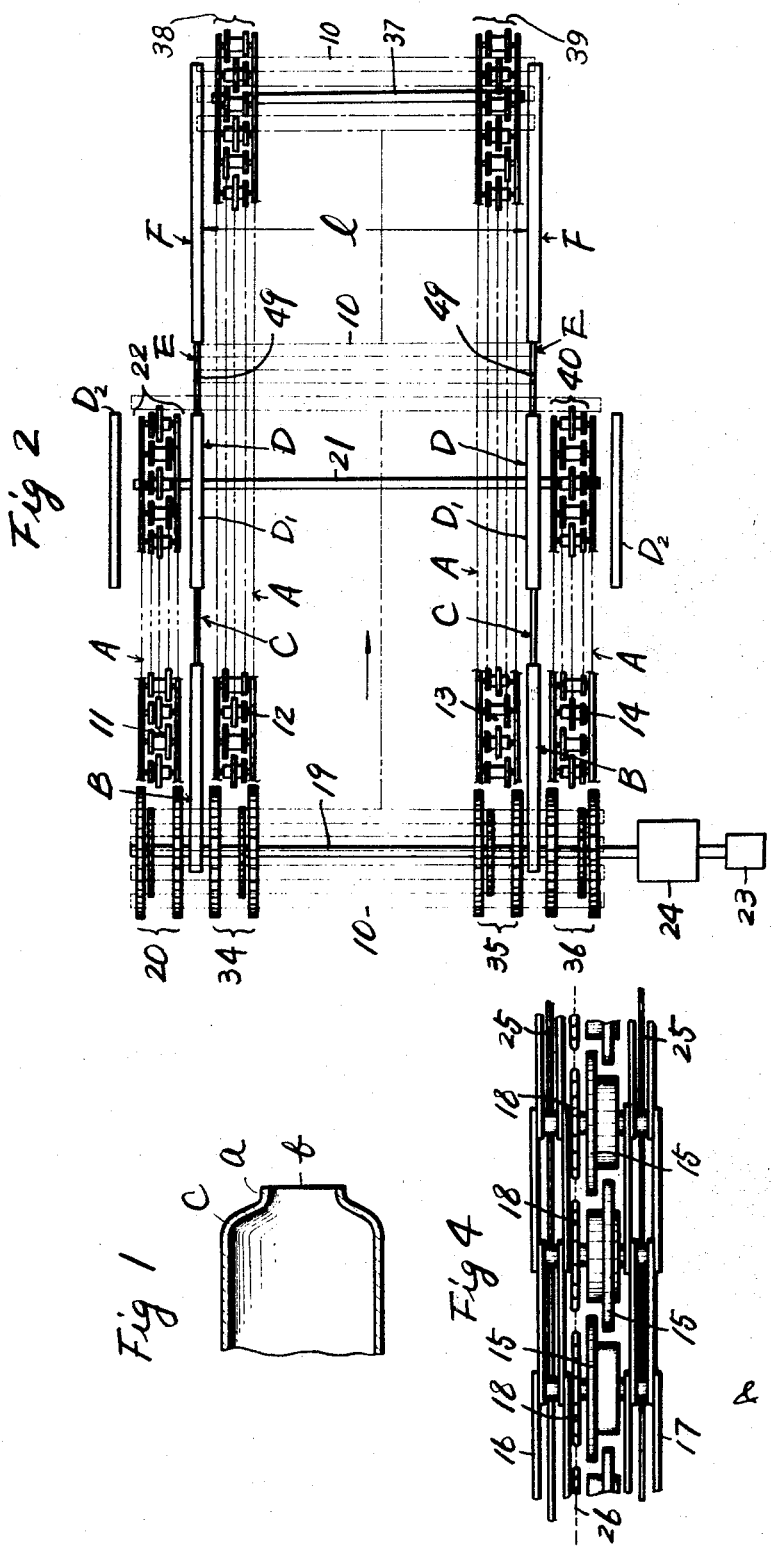

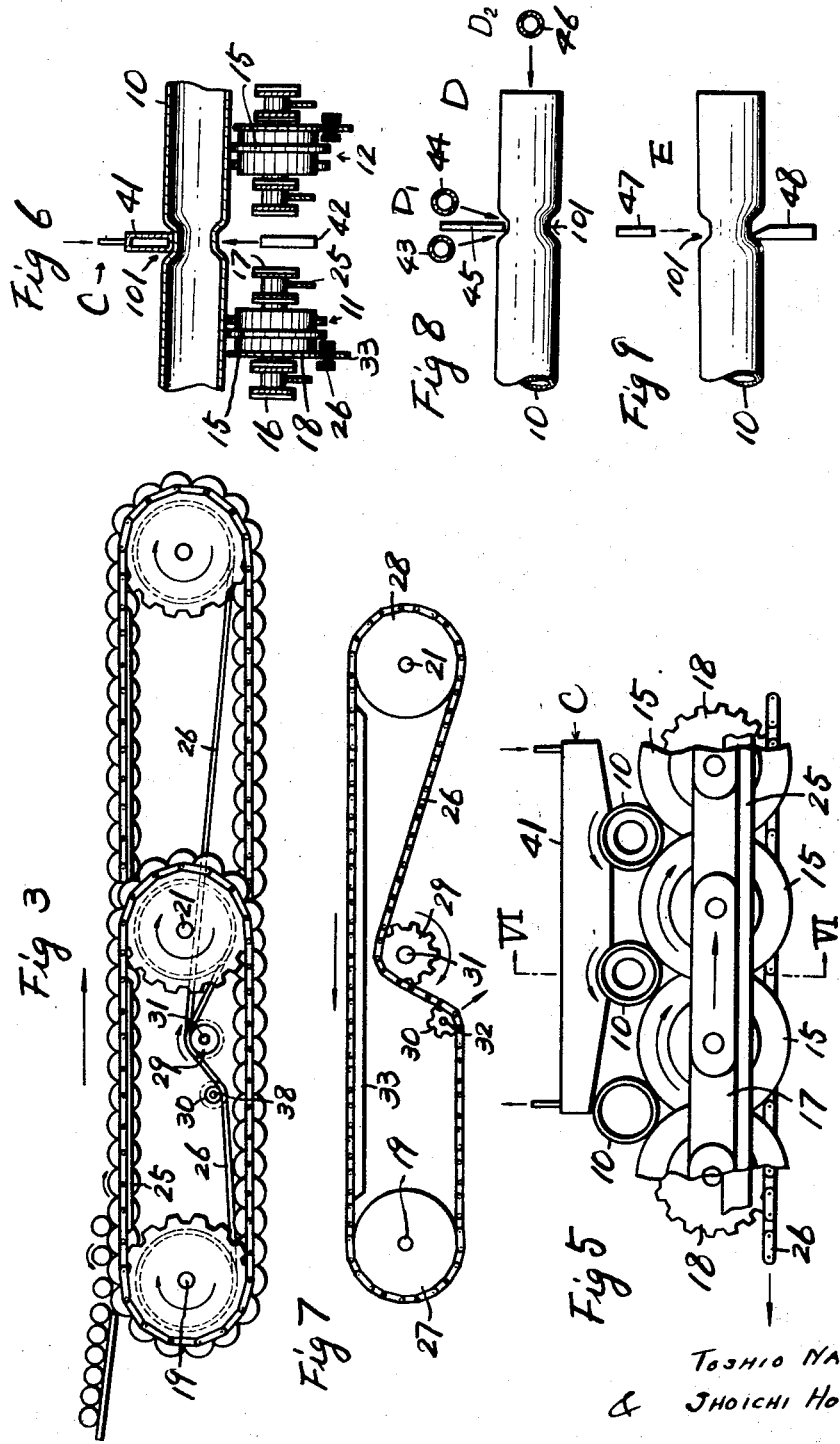

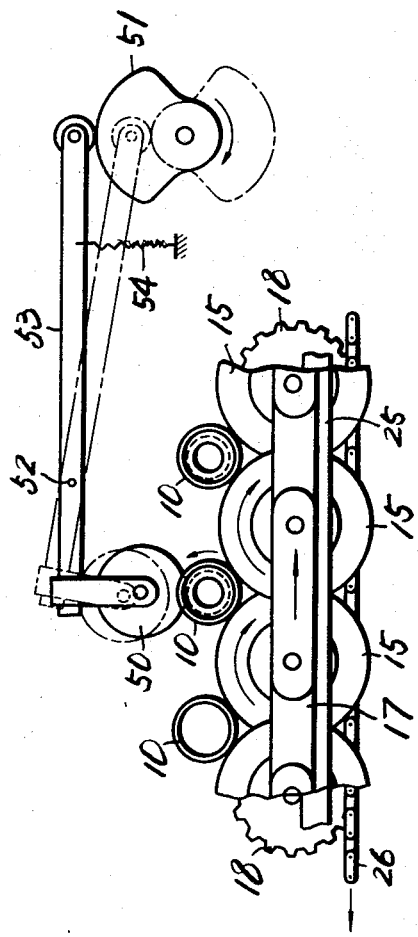

METHOD AND APPARATUS FOR SHAPING THE ENDS OF GLASS TUBE

BACKGROUND OF THE INVENTION

1. Field of the Invention

The present invention relates to a method of and apparatus for squeeze shaping the ends of a glass tube.

2. Description of the Prior Art

For the squeeze shaping of the ends of a glass tube, various methods are known. In these known methods, the ends of a glass tube which are perpendicular to the glass tube axis and which are flat are heated to be softened and then squeeze shaped. In these methods, since the softened state when heated varies according to the size of the tube diameter and thickness, there are disadvantages including (1) that as shown in FIG. 1 unevenness in length is produced in a squeeze-shaped parallel portion $a$, (2) that an opened portion $b$ does not become flat and instead it becomes undulated or oval and (3) that the rounder shape of a squeezed portion $c$ does not become uniform. These disadvantages are rather noticeable particularly in the case of a fluorescent bulb of large diameter and small wall thickness. Further, under certain shaping conditions it sometimes happens that the tube is deviated in the direction of the tube axis. Therefore, if the ends of the tube are simultaneously shaped, it sometimes happens that the parallel portions become longer at one end and shorter at the other. Therefore, it is usual with the conventional methods that one end of a tube is first squeeze shaped and then the other end. Thus, the conventional methods involve cutting a glass tube to provide a length at least 50–60 mm. greater than the finish length, subjecting the cut surface to sufficient preparatory mouth-burning to prevent chipping, working the glass tube on a shaping machine where, with the unshaped tube end held against a stop to prevent movement in the direction of the tube axis, the other end is cut off to provide a flat surface perpendicular to the tube axis at a section 20–30 mm. away from the end and is then heated to be softened to carry out a shaping treatment, after which with the shaped end held against the stop, the unshaped end is likewise shaped in the same manner described above. In this case, after a length of 20–30 mm. from the tube end is cut off so as to provide a required length for the shaped glass tube, shaping is carried out in the same manner as described above.

In the aforementioned methods, besides the previously described deviation occurring in the shaped portions, the following disadvantages result.

In general, the ends of an unshaped glass tube are very brittle. Therefore, unless an end of an unshaped glass tube is fully mouth-burnt prior to tube end treatment, that portion would chip when the tube end of said unshaped glass tube is brought into abutment against a stopper. In short, a preparatory mouth-burning step is needed. When both ends are subjected to squeeze shaping, since such ends are shaped one by one, a tube end shaping apparatus of long line is needed.

A contrivance for preventing uneveness in the squeezed diameter due to a deviation in glass tube diameter is disclosed, for example, in Japanese Patent Publication No. 13,418 of 1961, but with the recent advance of glass tube shaping technology, the deviation in the tube diameter is decreasing, with the result that differences in the squeezed diameter are no longer so great as to present problems and can now be neglected.

SUMMARY OF THE INVENTION

The present invention provides an improved method of and an improved apparatus for shaping the ends of a glass tube, characterized by comprising glass tube transfer means consisting of long and short groups of rollers for transferring glass tubes while rotating them, and series of tube end treating systems correspondingly installed on both sides of the glass tube transfer means in intermediate positions corresponding to the desired tube length of the glass tubes, i.e., heating means for squeeze shaping, shaping means, cooling means, cutting means and mouth-burning means, whereby during transfer of glass tubes, intermediate portions of a glass tube close to both ends thereof are simultaneously squeeze shaped by said tube end treating systems without involving a preparatory mouth-burning step and the thus squeeze-shaped glass tube is then cut to a required length and mouth-burnt.

BRIEF DESCRIPTION OF THE DRAWINGS

In the accompanying drawings illustrating preferred embodiments of the present invention:

FIG. 1 is a sectional view showing a shaped portion of a glass tube end;

FIG. 2 is a plan view showing outlines of a shaping machine according to the present invention;

FIG. 3 is a front view of FIG. 2;

FIG. 4 is an enlarged plan view showing part of glass tube transfer means;

FIG. 5 is an enlarged front view of a squeeze-shaping section;

FIG. 6 is a sectional view on the line VI—VI of FIG. 5;

FIG. 7 is a front view showing a chain for rotating the rollers of glass tube transfer means;

FIG. 8 is an explanatory view of cooling means;

FIG. 9 is an explanatory view of cutting means; and

FIG. 10 is an explanatory view of a modification of the squeeze-shaping section.

DESCRIPTION OF THE PREFERRED EMBODIMENTS.

In a preferred embodiment of a glass tube end shaping apparatus shown in FIGS. 2 through 9, this novel inventive apparatus comprises means A for transferring a number of elongate glass tubes in a parallel and horizontal state while rotating them, and series of tube end treating systems correspondingly installed in intermediate positions corresponding to the portions to be treated in spaced relation to both ends of the glass tube along the transfer path of the glass tube, i.e., heating means (B), shaping means (C); cooling means (D), cutting means (E) and mouth-burning means (F).

According to the invention, the novel inventive apparatus has the following features:

The means (A) for transferring glass tubes 10 in the direction of arrow while rotating them consists of four rows of roller groups 11, 12, 13 and 14. These four rows of roller groups have the same structure, but the roller groups 11 and 14 on both sides are shorter than the other roller groups 12 and 13. The structure of the roller group 11 will now be described with reference to FIGS. 4 through 6, description of the other roller groups being omitted.

As shown in FIG. 4, rollers 15 constituting the roller group 11 are rotatably supported between two chains 16 and 17. The diameter of each roller 15 is slightly greater than the chain pitch. Therefore, the rollers are disposed in zigzags so that the opposed peripheral edges overlap each other between the two chains 16 and 17, as shown in FIGS. 4 and 5. All the rollers 15, on the boss portions on the same side, have chain wheels 18 smaller in diameter than the chain pitch and integral therewith. These chain wheels are disposed in a straight line between the chains 16 and 17.

The roller group 11 of the aforementioned structure is entrained around a set of two chain wheels 20 fixed on a common shaft 19 and around a set of two chain wheels 22 loosely fitted on a shaft 21.

The common shaft 19 is connected to a speed-change device connected to a prime mover 23 and is slowly rotated in the direction of arrow by the rotation of the prime mover 23. Therefore, the roller group 11 entrained around the chain wheels 20 fixed on this common shaft 19 moves slowly in the direction of arrow.

Between the chain wheels 20 and 22 around which the chains 16 and 17 of said roller group 11 are entrained, there are provided guide rails 25 for preventing said chains 16 and 17 from slacking. The guide rails are fixed to the main body of the shaping machine.

As shown in FIGS. 3, 5, 6 and 7, a separate chain 26 is provided on the lower edge of the row of the chain wheels 18 fixed on the respective rollers 15 of said roller group 11, so that said chain 26 meshes with all the chain wheels 18. As shown in FIG. 7, the chain 26 is entrained around rollers 27 and 28, drive chain wheel 29, and tension wheel 30. The drive chain wheel 29 is fixed on a separate common shaft 31, which is connected to a separate drive source (not shown) and is rotating in the direction of arrow. Therefore, the chain 26 moves in a direction opposite to the direction of movement of the roller group 11 and is rotating all the rollers 15 in the direction of arrow. The tension wheel 30 is rotatably mounted on a shaft 32. The shaft 32 is swingably mounted on the main body of the shaping machine and is constantly pulled by a spring (not shown) in the direction of arrow, thereby preventing the chain 26 from slacking. On the lower side of the upper flight of the endless chain 26, there is provided a guide rail 33 fixed to the main body of the shaping machine for preventing the rollers from moving sideways away from the chain wheels as the chain slacks.

While the above refers to the structure of the roller group 11, the other roller groups 12, 13 and 14 have the same structure as described above.

The roller groups 12, 13 and 14 having the same structure as the roller group 11 are arranged as shown in FIG. 2. Thus, these roller groups 12, 13 and 14 are respectively entrained around sets of chain wheels 34, 35 and 36 (each set consisting of two chain wheels) fixed on the common shaft 19, sets of chain wheels 38 and 39 (each set consisting of two chain wheels) loosely fitted on a shaft 37 and a set of two chain wheels 40.

Because of the aforementioned structure, the rotation of the common shaft 19 moves the four rows of roller groups 11, 12, 13 and 14 at the same speed to the right as viewed in the figure, while the rotation of the other common shaft 31 causes all the rollers of all the roller groups to be rotated at the same speed in the direction of arrow.

On both sides of the means A of the aforementioned structure for transferring the glass tubes 10 in the direction of arrow, there are provided a pair of heating means B, a pair of shaping means C, a pair of cooling means D each consisting of external cooling means $D_1$ and internal cooling means $D_2$, a pair of cutting means E and a pair of mouth-burning means F.

The heating means B, shaping means C and external cooling means $D_1$ are disposed between the roller groups 11 and 12 and between the roller groups 13 and 14 and, as shown in FIG. 6, are made to correspond to intermediate portions close to the ends of the glass tube 10. The internal cooling means $D_2$ are disposed respectively outside the roller groups 11 and 14 so as to correspond to the external cooling means and, as shown in FIG. 8, are opposed to the opening in the uncut glass tube. In short, the aforementioned means B, C and D are disposed over the entire length of the roller groups 11 and 14.

The other means, i.e., the cutting means E and mouth-burning means F are disposed in line with the aforementioned means B, C and D and outside the roller groups 12 and 13.

The corresponding distance l of these means B, C, D, E, and F is made equal to the desired tube length of glass tubes.

The arrangement of the aforementioned means will now be described in more detail. Each heating means B is supported by means of a support fixed to the main body of the shaping machine so that a region of a glass tube 10 which is to be subjected to shaping treatment can be heated from above.

The shaping means C, as shown in FIGS. 5 and 6, consists of a shaping rail 41 disposed above the path of travel of the intermediate portion of the glass tube close to each end thereof and a burner 42 disposed below said path of travel. The shaping rail 41 is a hollow rail made of a heat-resistant alloy so that water is circulated in the direction of arrow to cool the shaping rail. The lower edge of the shaping rail 41 has its front portion corresponding to one-third the length thereof gradually inclined downwardly with its middle portion being horizontal and with its rear portion corresponding to about one-fifth the entire length being gradually inclined upwardly. Therefore, when each glass tube 10 is transferred to the right while being rotated, it is gradually squeezed by said shaping rail 41 so that it is fully shaped to the required size at the horizontal middle portion and leaves the shaping rail at the rear portion. When the shaping rail comes into contact with the heated portion of the glass tube, the temperature decreases; therefore the shaped portion of the glass tube is heated from below by the burner during shaping to constantly maintain the glass tube at a fixed temperature. In this glass tube squeeze-shaping section, since the squeezed portions 101 of the glass tube are supported by the two roller groups 11, 12 and 13, 14, squeeze shaping can be satisfactorily carried out.

FIG. 10 shows a modification of the shaping means C, using a shaping roller instead of the shaping rail. As shown in FIG. 10, the means consist of a shaping roller 50 disposed above the path of travel of the intermediate portion of the glass tube 10 close to each end thereof and a cam 51 for lowering said shaping roller to the squeezing position. This means will now be described in more detail.

The shaping roller 50 is secured to a lever 53 turnable around the axis of a pivot 52. The lower end of lever 53 is constantly urged against the peripheral surface of the cam 51 by a spring 54. The shape of the cam is such that when the glass tube 10 comes to a position below the shaping roller 50 and stops there, it lowers the shaping roller to the desired position. However, it is to be understood that even if the glass tube stops its travel for a predetermined period of time below the shaping roller, the glass tube is constantly rotated by the rollers 15. In the case where the desired portions of the glass tube are to be subjected to squeeze shaping by using shaping rollers as described above, it is necessary to intermittently move the transfer means with the arrangement pitch of the glass tubes. The intermittent movement of the transfer means may be effected by driving the drive shaft 19 by using a Geneva mechanism or the like.

The glass tube after being shaped is cooled by the cooling means D shown in FIG. 8. Thus, the external cooling means $D_1$ consists of pipes 43, 44 and a guide rail 45 and is so supported by a support fixed to the main body of the shaping machine as to cool the shaped portion 101 of the glass tube 10 from above. The pipes 43 and 44 have many small holes provided in the lower side thereof, so that compressed air is emitted through the small holes in the direction of arrow to cool the squeeze-shaped portion 101 of the glass tube 10. The guide rail has a slightly thinner thickness than the shaping rail 41 and, as shown in FIG. 8, is disposed in a position slightly spaced away from the circumference of the smallest diameter region of the squeeze-shaped portion of the glass tube 10, whereby the transverse deviation of the glass tube 10 due to the emission of cooling air is prevented. The internal cooling means $D_2$ consists of a pipe 46 extending parallel to the roller groups and having many small holes provided in the side thereof facing to the tube end. Compressed air is emitted through these holes in the direction of arrow into the glass tube through the end opening therein.

The fully cooled glass tube 10 is cut approximately at the middle of the shaped portion by the cutting means E. The latter consists of a cutter burner 47 for heating the shaped portion 101 from above, a guide 48 provided below the shaped portion 101 for assuring cutting at a fixed place, as shown in FIG. 9, and a cutter 49 shown in FIG. 2. The cutter 49 is a known thin circular plate with a sharp edge and is rotating below the glass tube 10, with the lower half of the cutter being immersed in water contained in a water tank and with the sharp edge being slightly in contact with the portion of the glass tube at which it is to be cut. The cutter 49 chill-cuts the desired place of the glass tube.

In order to assure cutting at a fixed place, during heating, the guide 48 is adapted to be lightly contacted with the shoulder of the shaped portion of the glass tube 10, that is, with a point on route to the smallest diameter portion produced in the glass tube as the glass tube is squeezed, so that the position of the glass tube is kept unchanged. Then the glass tube is mouth-burnt by the mouth-burning means F provided laterally of the roller groups 12, 13 to make the cut surfaces smooth, is successively cooled with gentle flames and is then taken out. The mouth-burning means uses a known burner.

As described above, since the shaping apparatus according to the method of the present invention does not require any complex mechanism, the maintenance and control thereof are extremely easy. Further, since glass tubes produced by the drawing process can be directly worked on the shaping machine, it is possible to use the shaping apparatus according to the invention in such a manner that it is connected directly to such tube drawing machine. Therefore, the number of processing steps can be reduced. Further, by arranging the heating means, shaping means, cooling means, cutting means and mouth-burning means in predetermined spaced relation so that the distance between the respective means on both sides corresponds to a desired tube length, it is possible to subject the intermediate portions of a glass tube close to the ends thereof simultaneously to shaping treatment. Therefore, products with small deviation in shape and size can be obtained.

Particularly, since the invention subjects the intermediate portions of an unshaped glass tube close to the ends thereof simultaneously to shaping treatment, there is no need of pressing the end of the unshaped glass tube against a stopper of the like during shaping treatment. Therefore, a preparatory mouth-burning step can be omitted. Further, since the end of an unshaped glass tube is not pressed against a stopper, as described above, there is no damage to the unshaped glass which would otherwise occur when it is pressed against a stopper. Therefore, the yield rate is high.

IN SUMMARY

As shown generally in FIG. 2, the present invention provides a method for producing a shaped glass tube having squeeze-shaped ends, which method comprises, in combination (a) providing a tube blank 10 which is somewhat longer than the required length of the shaped tube to be formed, as is shown at the upstream and downstream ends of the transfer path indicated by the arrow at the center of FIG. 2; (b) rotating said blank 10 about its axis and simultaneously bodily moving said rotating blank in a direction transverse to said axis, (c) simultaneously softening areas of the so moving rotating blank lying adjacent to but spaced from the ends of the so moving rotating blank by heating said areas (at B, FIG. 2), said areas being spaced from each other by a distance (1) corresponding to the length of the shaped glass tube to be formed, (d) simultaneously (at C) applying squeezing pressure in the heated areas of the so moving rotating blank to reduce the tube diameters in said areas, (e) simultaneously (at E) cutting through the so moving rotating blank in said reduced diameter areas to separate the blank into a so moving rotating central tube portion of said required length and two freed end portions, (f) removing said freed end portions (adjacent E) and (g) simultaneously flaming the cut ends of said moving rotating central portion to effect mouth-burning thereof (at F). And in preferred embodiments, as a part of the squeezing step, the reduced diameter areas of the tube (101, FIG. 8) are hardened by cooling (at D) as a prelude to the cutting step; as part of the flaming step (F) the flame smoothed portions of the tube are annealed by successively cooling in gentle flame before discharge; and during the practice of the method the moving rotating tube blank during its passage downstream to the cutting area E, is supported in four regions as by the conveyors 20, 34, 35, 36, two of which (34 and 35) lie between and proximate to, but spaced from, the areas being heated and squeezed and cooled, and the other two of which (20 and 36) lie outside of and proximate to but spaced from the said areas, the support of the moving rotating central portion of the tube being maintained (as by conveyor 34 and 35) during the cutting and mouth-burning steps (at E and F).

Likewise, from the machine standpoint, the invention provides apparatus for continuously producing shaped glass tubes having squeeze-shaped ends from tube-blanks somewhat longer than the required length of the shaped tubes to be formed, said apparatus comprising: (a) means shown as conveyors 20, 34, 35 and 36, for receiving and supporting said blanks in a parallel array in a horizontal plane and for simultaneously rotating the blanks about their longitudinal axes and bodily moving the same continuously along said plane in a downstream direction transverse to said axes, to a point of delivery thereof, (b) heating means (B) arranged along the paths traversed by the ends of the moving rotating blanks, and positioned for simultaneously softening areas of said moving rotating blanks spaced from the opposite ends thereof and separated by a distance corresponding to the length (1) of the shaped glass tubes to be formed, (c) squeezing means (C) arranged along said paths downstream of said heating means for simultaneously applying squeezing pressure in the heated areas of the moving rotating blanks to reduce the tube diameter in said areas, (d) cutting means (E) arranged along said paths downstream of said squeezing means for simultaneously cutting through the moving rotating blanks in the two reduced diameter areas thereof for separating each of the moving rotating blanks, one after the other, into a moving rotating central tube portion of said required length and two freed end portions, (e) the apparatus along said paths at the downstream end of said cutting means providing at 22 and 40 for the removal of the freed end portions cut off thereby, and (f) means for simultaneously mouth-burning the two cut ends of the so moving rotating central tube portion, comprising flaming means (F) arranged along said paths downstream of said cutting means. And in preferred embodiments, as above described, cooling means D arranged along said paths between the squeezing means C and the cutting means E for hardening the reduced diameter areas of the rotating tubes moving to said cutting means; and the conveying means 20, 34, 35, 36, are arranged to afford four region and two region support as above described, most preferably being of the traveling roller type for concurrently moving and rotating the tubes, as shown.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. A method for producing a shaped glass tube having squeeze-shaped ends, which method comprises in combination:
  a. providing a tube blank somewhat longer than the required length of the shaped tube to be formed,
  b. rotating said blank about its axis and simultaneously bodily moving said rotating blank in a direction transverse to said axis,
  c. simultaneously softening areas of the so moving rotating blank lying adjacent to but spaced from the ends of the so moving rotating blank by heating said areas, said areas being spaced from each other by a distance corresponding to the length of the shaped glass tube to be formed,
  d. simultaneously applying squeezing pressure in the heated areas of the so moving rotating blank to reduce the tube diameter in said areas,
  e. simultaneously cutting through said moving rotating blank in said reduced diameter areas to separate the blank into a so moving rotating central tube portion of said required length and two freed end portions,
  f. removing said freed end portions, and
  g. simultaneously flaming the cut ends of said moving rotating central portion to effect mouth-burning thereof.

2. A method as claimed in claim 1, wherein in step (d) the reduced diameter areas produced in the so moving rotating tube are hardened by cooling, as a prelude to step (e).

3. A method as claimed in claim 2, wherein the moving rotating tube blank during steps (b), (c) and (d) is supported in four regions, two of which lie between and proximate to but spaced from the areas referred to in steps (c) and (d) and the other two of which lie outside of and proximate to but spaced from said areas, and wherein during steps (e), (f) and (g) the moving rotating central tube portion is supported at two regions proximate to but spaced from its cut ends.

4. Apparatus for continuously producing shaped glass tubes having squeeze-shaped ends from tube-blanks somewhat longer than the required length of the shaped tubes to be formed, said apparatus comprising:
   a. means for receiving and supporting said blanks in a parallel array in a horizontal plane and for simultaneously rotating the blanks about their longitudinal axes and bodily moving the same continuously along said plane in a downstream direction transverse to said axes, to a point of delivery thereof,
   b. heating means arranged along the paths traversed by the ends of the moving rotating blanks, and positioned for simultaneously softening areas of said moving rotating blanks spaced from the opposite ends thereof and separated by a distance corresponding to the length of the shaped glass tubes to be formed,
   c. squeezing means arranged along said paths downstream of said heating means for simultaneously applying squeezing pressure in the heated areas of the moving rotating blanks to reduce the tube diameters in said areas,
   d. cutting means arranged along said paths downstream of said squeezing means for simultaneously cutting through the moving rotating blanks in the two reduced diameter areas thereof for separating each of the moving rotating blanks, one after the other, into a moving rotating central tube portion of said required length and two freed end portions, the apparatus along said paths at the downstream end of said cutting means providing for the removal of the freed end portions cut off thereby, and
   e. means for simultaneously mouth-burning the two cut ends of the so moving rotating central tube portions, comprising flaming means arranged along said paths downstream of said cutting means.

5. Apparatus as claimed in claim 4, further comprising:
   f. cooling means arranged along said paths between said squeezing means and said cutting means for hardening the reduced diameter areas of the rotating blanks moving to said cutting means.

6. Apparatus as claimed in claim 5, wherein the means (a) comprises conveying means arranged at each side of each of said paths in positions to support said blanks at both sides of each of said areas during the movement thereof downstream past said cutting means.

7. Apparatus as claimed in claim 6, wherein said conveying means are of the travelling roller type for concurrently moving and rotating said tubes, and wherein the conveying means arranged between said paths have a traverse which extends to said point of delivery, while the conveying means arranged outside said paths extend therealong only upstream of said cutting means.

* * * * *